United States Patent
Tirillo

Patent Number: 5,997,921
Date of Patent: Dec. 7, 1999

[54] TACO SHELL BLANK

[76] Inventor: Anthony Tirillo, 1804 Keenland Cir., West Palm Beach, Fla. 33415

[21] Appl. No.: 09/031,381

[22] Filed: Feb. 26, 1998

[51] Int. Cl.[6] .............................. A21D 6/00; A21D 8/00; A21D 10/00
[52] U.S. Cl. ......................... 426/138; 426/143; 426/560; 426/391; 426/502
[58] Field of Search ................................. 426/138, 139, 426/94, 391, 502, 503, 143, 560; 99/426, 439, 428; D1/122, 123, 124, 125, 130, 199; 229/938

[56] References Cited

U.S. PATENT DOCUMENTS

| | | | |
|---|---|---|---|
| D. 259,670 | 6/1981 | de Leon | D1/122 |
| D. 277,234 | 1/1985 | Bank | D1/122 |
| D. 316,622 | 5/1991 | Popiel | D1/122 |
| D. 376,893 | 12/1996 | Gornet | D1/122 |
| 2,367,675 | 1/1945 | Greenleaf | 229/938 |
| 3,003,207 | 10/1961 | Powers | 229/938 |
| 3,391,782 | 7/1968 | Kaspar | 229/938 |
| 3,653,337 | 4/1972 | Hanson | 426/138 |
| 3,928,638 | 12/1975 | Stickle | 426/439 |
| 4,438,145 | 3/1984 | Bakker | 426/390 |
| 4,915,964 | 4/1990 | Smietaria | 426/282 |
| 4,950,490 | 8/1990 | Ghias et al. | 426/138 |
| 5,009,902 | 4/1991 | Mercenari | 426/138 |
| 5,234,705 | 8/1993 | Mani | 426/496 |
| 5,236,727 | 8/1993 | Huston | 426/138 |
| 5,314,113 | 5/1994 | Irigoite et al. | 229/938 |

*Primary Examiner*—Steven Weinstein
*Attorney, Agent, or Firm*—Joseph N. Breaux

[57] ABSTRACT

A taco shell blank formed from a dough that includes a circular shell portion, a rectangular end barrier portion integrally formed along a section of the perimeter edge of the circular portion and a crease line formed between the shell portion and the barrier portion; the circular shell portion of the taco shell blank being foldable about a midline thereof that runs through the rectangular end barrier portion to form an ingredient pocket; the rectangular barrier portion being foldable at the crease line and into position across the side end opening of the ingredient pocket.

1 Claim, 1 Drawing Sheet

5,997,921

1

TACO SHELL BLANK

TECHNICAL FIELD

The present invention relates to food items and more particularly to a taco shell blank formed from a conventional taco shell dough and including a circular shell portion, a rectangular end barrier portion integrally formed along a section of the perimeter edge of the circular portion; and a crease line formed between the shell portion and the barrier portion; the circular shell portion of the taco shell blank being foldable about a midline thereof that runs through the rectangular end barrier portion to form an ingredient pocket the rectangular barrier portion being foldable at at the crease line and into position across the side end opening of the ingredient pocket.

BACKGROUND ART

Tacos are a popular food item. Although tacos are popular, they can be messy to eat. This is particularly true among small children. It would be a benefit, therefore, to have a taco shell blank for forming a taco shell that provided a mechanism for maintaining the taco ingredients within the ingredient cavity of the taco shell while the taco is eaten.

GENERAL SUMMARY DISCUSSION OF INVENTION

It is thus an object of the invention to provide a taco shell that includes a mechanism for maintaining the taco ingredients within the ingredient cavity of the taco shell while the taco is eaten.

It is a further object of the invention to provide a taco shell blank formed from a conventional taco shell dough and including a circular shell portion, a rectangular end barrier portion integrally formed along a section of the perimeter edge of the circular portion; and a crease line formed between the shell portion and the barrier portion; the circular shell portion of the taco shell blank being foldable about a midline thereof that runs through the rectangular end barrier portion to form an ingredient pocket; the rectangular barrier portion being foldable at the crease line and into position across the side end opening of the ingredient pocket.

It is a still further object of the invention to provide a taco shell that accomplishes both of the above objects in combination.

Accordingly, a taco shell blank is provided. The taco shell blank is formed from a conventional taco shell dough and includes a circular shell portion, a rectangular end barrier portion integrally formed along a section of the perimeter edge of the circular portion; and a crease line formed between the shell portion and the barrier portion; the circular shell portion of the taco shell blank being foldable about a midline thereof that runs through the rectangular end barrier portion to form an ingredient pocket; the rectangular barrier portion being foldable at the crease line and into position across the side end opening of the ingredient pocket.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
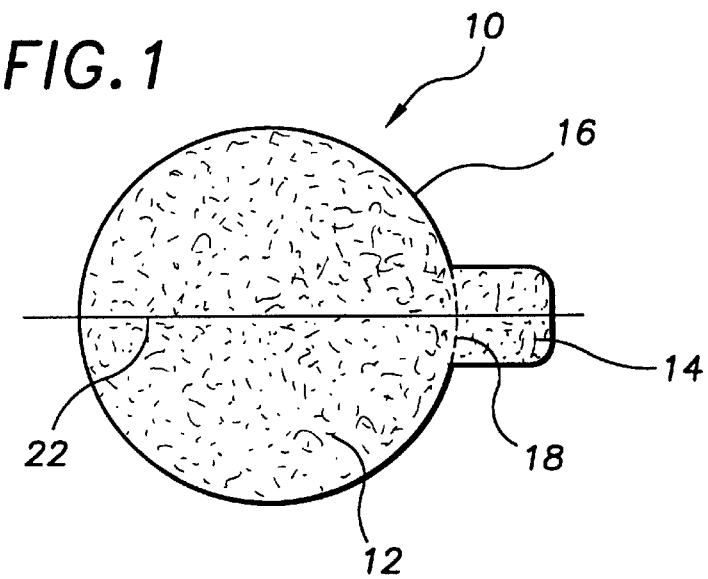
FIG. 1 is a top plan view of an exemplary embodiment of the taco shell blank of the present invention showing the circular shell portion; the rectangular end barrier portion integrally formed along a section of the perimeter edge of the circular portion; and the crease line formed between the shell portion and the barrier portion.

FIG. 1 shows an exemplary embodiment of the taco shell blank, generally designated 10, of the present invention. Taco shell blank 10 is formed from a conventional corn flour based tortilla dough and includes a circular shell portion 12, a rectangular end barrier portion 14 that is integrally formed along a section of the perimeter edge 16 of circular shell portion 12, and a crease line 18 formed between circular shell portion 12 and rectangular end barrier portion 14.

Figure 2:
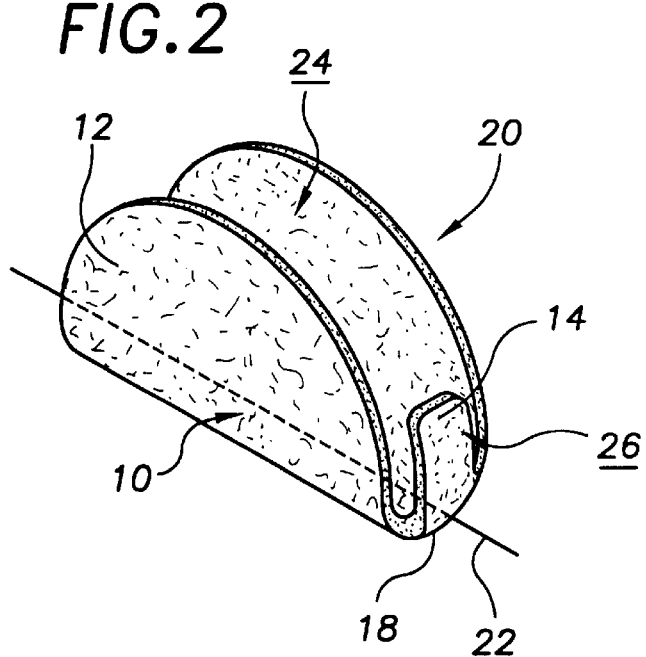
FIG. 2 is a perspective view showing the exemplary taco shell blank of FIG. 1 showing the circular shell portion folded about a midline thereof that runs through the rectangular end barrier portion to form an ingredient pocket and the rectangular barrier portion folded at the crease line and into position across the side end opening of the ingredient pocket to block taco ingredients from falling out of the ingredient pocket.
Figure 3:
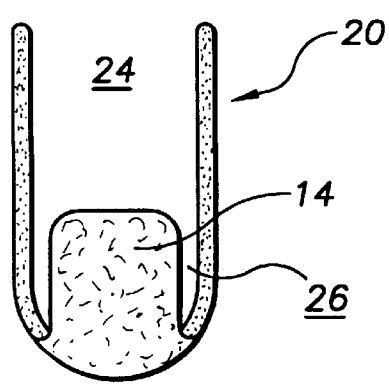
Fig. 3 is an end view of the taco shell blank of FIG. 2 showing the rectangular end barrier portion positioned within and blocking the side end opening of the ingredient pocket of the taco shell.

Referring to FIG. 2, taco shell blank 10 is formed into a taco shell, generally designated 20, by folding circular shell portion 12 generally about a midline 22 thereof (also shown in FIG. 1) that runs through rectangular end barrier portion 14 to form an ingredient pocket 24. Rectangular barrier portion 14 is then folded at crease line 18 into position across a side end opening 26 of ingredient pocket 24 to block taco ingredients from falling out of ingredient pocket 24 during consumption of the taco. Once taco shell 20 is formed, taco shell 20 is baked or fried to fix its shape. FIG. 3 shows rectangular end barrier portion 14 positioned within and blocking side end opening 26 of ingredient pocket 24 of taco shell 20.

It can be seen from the preceding description that a taco shell blank has been provided that includes a mechanism for maintaining the taco ingredients within the ingredient cavity of the taco shell while the taco is eaten; and that is constructed from conventional taco shell dough and includes a circular shell portion, a rectangular end barrier portion integrally formed along a section of the perimeter edge of the circular portion; and a crease line formed between the shell portion and the barrier portion; the circular shell portion of the taco shell blank being foldable about a midline thereof that runs through the rectangular end barrier portion to form an ingredient pocket; the rectangular barrier portion being foldable at the crease line and into position across the side end opening of the ingredient pocket.

It is noted that the embodiment of the taco shell described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A taco shell blank for forming a taco shell when said blank is folded and then baked or fried to fix its shape, said blank formed from corn flour based tortilla dough and comprising:

a circular shell forming portion, a rectangular end barrier forming portion projecting outwardly away from said circular shell forming portion and integrally formed with and connected to said circular shell forming portion along a section of a perimeter edge of said circular shell forming portion, and a crease line formed between said circular shell forming portion and said rectangular end barrier forming portion;

said circular shell forming portion of said taco shell blank being foldable about a midline thereof that runs through said rectangular end barrier forming portion to form a U-shaped taco shell defining an ingredient pocket having two opposed side end openings;

said rectangular end barrier forming portion being foldable at said crease line and into position across one of said side end openings of said ingredient pocket such that when said circular shell forming portion is folded to form said U-shaped taco shell and said rectangular end barrier forming portion is folded at said crease line and then the folded blank is heated to fix the taco shell shape, the folded rectangular end barrier forming portion will block said one of said side end openings and block taco ingredients that have been placed in the taco shell from falling out of the ingredient pocket through said blocked side end opening.

* * * * *